United States Patent
Meredith et al.

(10) Patent No.: US 9,794,271 B2
(45) Date of Patent: Oct. 17, 2017

(54) RESTRICTING COMMUNICATIONS BETWEEN SUBSCRIBER MACHINES

(71) Applicant: AT&T Mobility II LLC, Atlanta, GA (US)

(72) Inventors: Sheldon Kent Meredith, Roswell, GA (US); Mark Austin, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 219 days.

(21) Appl. No.: 14/526,755

(22) Filed: Oct. 29, 2014

(65) Prior Publication Data

US 2016/0127386 A1    May 5, 2016

(51) Int. Cl.
| | |
|---|---|
| H04L 29/06 | (2006.01) |
| H04L 29/08 | (2006.01) |
| H04W 4/08 | (2009.01) |
| H04W 4/20 | (2009.01) |

(52) U.S. Cl.
CPC ........ *H04L 63/126* (2013.01); *H04L 63/0428* (2013.01); *H04L 63/065* (2013.01); *H04L 63/101* (2013.01); *H04W 4/08* (2013.01); *H04W 4/206* (2013.01)

(58) Field of Classification Search
CPC .. H04L 63/26; H04L 67/1044; H04L 63/0428
USPC ...................... 713/168, 162–163; 726/26–30
See application file for complete search history.

(56) References Cited

U.S. PATENT DOCUMENTS

| | | | | |
|---|---|---|---|---|
| 4,531,020 A | * | 7/1985 | Wechselberger | H04L 9/0833 348/E7.056 |
| 6,832,314 B1 | * | 12/2004 | Irvin | H04L 1/0061 370/360 |
| 7,969,959 B2 | * | 6/2011 | Dabbs, III | H04W 4/06 340/441 |
| 8,200,963 B2 | | 6/2012 | Jin et al. | |
| 8,356,169 B2 | | 1/2013 | Ishikawa et al. | |
| 8,560,843 B1 | | 10/2013 | Moscaritolo et al. | |
| 8,595,329 B2 | | 11/2013 | Kleinfelter et al. | |

(Continued)

OTHER PUBLICATIONS

Configuring Encryption and Password Policy, Trend Micro Inc., 2012.*

(Continued)

*Primary Examiner* — Shanto M Abedin
(74) *Attorney, Agent, or Firm* — Hoffmann & Baron, LLP (57) ABSTRACT

A method of transferring information between subscribers associated with a communication service is disclosed. The method includes receiving a first handle address associated with a first subscriber device, in which the first subscriber device transfers information to a group of subscriber devices, each of the group of subscriber devices is linked to different handle addresses, and each of the different handle addresses is included in a group of handle addresses. The method also includes determining whether the first handle address is included in the group of handle addresses, transferring information from the first subscriber device to the group of subscriber devices in response to the first handle address being included in the group of handle addresses, and verifying that the transferred information was received by the group of subscriber devices. A corresponding system and computer-readable device are also disclosed.

16 Claims, 8 Drawing Sheets

(56) References Cited

U.S. PATENT DOCUMENTS

| | | | | |
|---|---|---|---|---|
| 2003/0235309 A1* | 12/2003 | Struik | .................. | H04L 63/065 380/278 |
| 2004/0044908 A1* | 3/2004 | Markham | ........... | H04L 63/0272 726/28 |
| 2004/0246984 A1* | 12/2004 | Hundscheidt | ......... | H04L 12/185 370/432 |
| 2005/0031119 A1* | 2/2005 | Ding | .................... | H04L 9/0833 380/28 |
| 2005/0278787 A1* | 12/2005 | Naslund | .................. | G06F 21/10 726/26 |
| 2007/0104194 A1* | 5/2007 | Wijnands | ............. | H04L 12/185 370/390 |
| 2008/0072035 A1* | 3/2008 | Johnson | ............. | H04L 63/0428 713/153 |
| 2008/0183827 A1* | 7/2008 | Rege | .................. | H04L 12/5835 709/206 |
| 2008/0281923 A1* | 11/2008 | Barchi | ................... | H04W 4/08 709/206 |
| 2010/0017607 A1* | 1/2010 | Shkolnikov | ............. | H04L 51/28 713/168 |
| 2010/0074446 A1* | 3/2010 | Fuchs | .................. | H04L 9/0833 380/278 |
| 2011/0035503 A1* | 2/2011 | Zaid | .................... | H04L 63/0407 709/228 |
| 2012/0151561 A1* | 6/2012 | Kreiner | ............... | H04L 12/1845 726/4 |
| 2012/0310752 A1* | 12/2012 | Gaddis | ............... | G06Q 30/0241 705/14.73 |
| 2013/0132995 A1* | 5/2013 | Tu | .................... | H04N 21/64322 725/27 |
| 2013/0318347 A1 | 11/2013 | Moffat | | |
| 2013/0325986 A1 | 12/2013 | Brady et al. | | |
| 2013/0337860 A1 | 12/2013 | Xu et al. | | |
| 2014/0052989 A1 | 2/2014 | Jones et al. | | |
| 2014/0114978 A1 | 4/2014 | Chatterjee et al. | | |
| 2015/0081436 A1* | 3/2015 | Robbins | ............. | G06Q 30/0255 705/14.53 |

OTHER PUBLICATIONS

Heen et al., "Distributed and Private Group Management", IEEE, 31st International Symposium on Reliable Distributed Systems, pp. 191-200 (2012).

Mannan et al., "Privacy-Enhanced Sharing of Personal Content on the Web", World Wide Web Conference Committee (IW3C2), pp. 487-496 (2008).

* cited by examiner

RESTRICTING COMMUNICATIONS BETWEEN SUBSCRIBER MACHINES

BACKGROUND

Technical Field

The present disclosure relates to a system and method for transferring information between a subscriber's subscribed computing machines associated with a communication service supported by a centralized or distributed set of computing resources.

Related Art

Typical services for low-volume texting communications are often limited to a certain number of characters. For example, a twitter-based tweet typically permits a text message of 140 characters. Generally, registered users can read and post text-based messages, but unregistered users can only read the messages. The character limit also delineates the types of devices or computing devices that can be interconnected and the type of information that can be transmitted. There are also generally restrictions on the number of messages that can be generated and transmitted from a specific user in order to prevent a backend systems from experiencing malfunctions associated with excessive messages or tweets. Typically, users may access the services through a website interface, short-messaging service (SMS), or mobile device applications.

SUMMARY

The disclosed embodiments are directed to a method of transferring information between subscribers associated with a communication service. The method includes receiving a first handle address associated with a first subscriber device. The first subscriber device transfers information to a group of subscriber devices, and each of the group of subscriber devices is linked to different handle addresses. Each of the different handle addresses is included in a group of handle addresses. The method also includes determining whether the first handle address is included in the group of handle addresses, transferring information from the first subscriber device to the group of subscriber devices in response to the first handle address being included in the group of handle addresses, and verifying that the transferred information was received by the group of subscriber devices.

Typical services for low-volume texting communications are often limited to a certain number of characters. For example, a twitter-based tweet typically permits a text message of 140 characters. Generally, registered users can read and post text-based messages, but unregistered users can only read the messages. The character limit also delineates the types of devices or computing devices that can be interconnected and the type of information that can be transmitted. There are also generally restrictions on the number of messages that can be generated and transmitted from a specific user in order to prevent backend systems from experiencing malfunctions associated with excessive messages or tweets. Typically, users may access the services through a website interface, short-messaging service (SMS), or mobile device applications.

The disclosed embodiments are further directed to a system that transfers information between subscribers associated with a communication service. The system includes a receiver that receives a first handle address associated with a first subscriber device. The first subscriber device transfers information to a group of subscriber devices, and each of the group of subscriber devices is linked to different handle addresses. Each of the different handle addresses is included in a group of handle addresses. The system also includes a comparator that determines whether the first handle address is included in the group of handle addresses. The system also includes a transmitter that transfers information from the first subscriber device to the group of subscriber devices in response to the first handle address being included in the group of handle addresses, and a tracker that verifies the transferred information was received by the group of subscriber devices.

The transmitter may provide an encryption key to the first subscriber device, and the encryption key may enable the first subscriber device to identify the group of handle addresses to which a decryption key was delivered. The transmitter may provide the decryption key to the group of handle addresses. The group of subscriber devices may include a sub-group of subscriber devices, and the sub-group of subscriber devices may enable selective messaging between subscribers devices associated with the sub-group of subscriber devices. The first subscriber device may request a general exclusion of membership in the group of subscriber devices. The first subscriber device may request a general exclusion of membership in the sub-group of subscriber devices. The first subscriber device may request a specific exclusion of membership with a specific subscriber device. The comparator may grant an exclusion in response to acceptance of an encrypted exclusion offer. The comparator may grant an exclusion in response to acceptance of an encrypted exclusion offer.

The disclosed embodiments are further directed to a computer-readable device storing instructions that, when executed by a device, cause the device to perform operations that include receiving a first handle address associated with a first subscriber device. The first subscriber device transfers information to a group of subscriber devices. Each of the group of subscriber devices is linked to different handle addresses of the group of handle addresses. Each of the different handle addresses is included in the group of handle addresses. The system also includes determining whether the first handle address is included in the group of handle addresses, transferring information from the first subscriber device to the group of subscriber devices in response to the first handle address being included in the group of handle addresses, and verifying that the transferred information was received by the group of subscriber devices.

Embodiments of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Typical text-based messaging services and platforms associated with such services have limited scope with regard to the exchange of content and computing resources dedicated to tracking content in order to service clients. Therefore, it would be beneficial for machines to be able to exchange communications without restrictions of character limits, type of content, time limits for posting video content and/or the number of messages that can be posted. In addition, the posting of content is limited to subscriber groups and/or sub-groups providing greater exclusivity and privacy with exchanged content between subscribers to the service.

Such systems provide services using computer resources available over a network and/or mobile devices without end-use knowledge of physical location, IP addresses, and configurations of respective physical computer resources. Such environments also permit encrypted communications that are tracked by a dedicated computing resource, such as a cloud server, central server, or distributed processing system.

Social networking or social structures composed of individuals or organizations may be connected by one or more types of interdependency, such as friendship, professional profiles, financial information or exchange, common interest, kinship, and other factors that may tie a user to a social networking site, such as Facebook, LinkedIn®, Twitter or Google's Social Circle. While these social networks are generally experiencing a growing population of end-users, with each network generally accessible from a wide variety of portals with Internet access, including personal computers, laptops, smartphones, gaming systems, personal digital assistants, tablets, and the like, access is generally available free of charge, but depending on the type of social networks and an individual user's privacy setting, a communication sent by a user may reach either a very large or a limited group of users. While these social networks do permit private social networks to facilitate communications and transmission of information between users, these social networks are not tailored toward the particular industry implementing the service nor restricted to subscribers and sub-groups within the particular industry. Further, the transmitted information is generally constrained to formats specified by the service being used and communications between the service and each user's device may by encrypted. Thus, the content of communications is generally exposed to the service.

Tweets, for example, are text-based messages of up to 140 characters that can be transmitted from a user's mobile device or computer. The tweet is sent to a Twitter server, which relays the tweet to a list of users or followers who signed up to receiver the sender's tweets. Other forms of microblogging services provide multimedia communication messaging, including text messaging, broadcast messaging, photo and/or video sharing, and the like.

One practical issue that arises from Twitter use is a twitter storm phenomena, in which media analytic entities can be inundated with noise, such as retweeted messages at a higher frequency than usual. Another practical issue is that the original messages act as a catalyst for messaging on a topic that draws significant sentiment and commentary thereto among the users. Storms of these messages from the flood of input data into the Twitter search engine can drown out useful information and/or create practical problems with resolving the burst of data from such storms. Social media are generally subject to these storms of data, in which news, social media phenomena of varying nature, such as humor, spam, overwhelming expressions of sentiment, and the like can overwhelm the original message's intended scope.

Therefore, there is a current need to provision for an exclusive service of subscribed machines that is privately tailored towards a certain industry's business models, goals, or intended messages that would enable subscribers to the service to exchange messages without requirements for administrators at intermediate transmission points to reach intended recipients' machines. There is a further need to provision for a service without the drawbacks of existing online social networking services which oftentimes clog the service provider's systems with storms of unwanted messaging and content. The provisioned service can span various industries, such as government, private, service-based, and educational industries which desire a form of compact broadcasted form of expression that covers every language and industry that is specifically tailored towards an entity's industry and/or business goals while avoiding storms of unwanted content.

There is also a current need to provision or classify bursts of social media content by category to permit noise-free and tailored delivery of content to subscriber(s) based on their requests for delivery of only certain types of content despite being recognized as subscribers to a group or sub-group of users of the provisioned service for the particular industry. The disclosed system and method can identify the content type in advance of delivery and ensure delivery of content that subscribers to the group or sub-group anticipated as appropriate content type and volume for the particular sub-group of subscribers to the service. This feature is considered a valuable tool for businesses, customers, government agencies, and/or educational institutions, since it promulgates data that is better classified and generally noise free. Additionally, users can derive educated and more intelligent insights from the exchanged content, subscribers can better manage customer expectations when indicated and take more realistic actions where necessary based, for example, on the company's current public image. When communications type content is sent from any machine to another machine, group, or sub-group, metadata associated with the content is used to describe the content, so that the receiving machines can individually apply filters regarding receipt of the content. For example, a first machine may be a government meteorology machine that transmits temperature and wind speed information daily in a file to a group of machines. Each of these machines could read the metadata for the two files and choose to receive or reject either or both of the files based on defined filters.

The disclosed embodiments provide a service that sends and receives secure messages or communication using encryption keys for establishing and maintaining secure communication to a group or sub-groups of subscribed machines. The communications are private and exclusive to machines of the group or sub-groups. The service itself does not share in the decryption credentials, thereby ensuring true privacy of the communications between machines that are subscribers to the service. In the event any content is exchanged between machines in an unencrypted format, the same content would be exposed to the service. The service has various applications in different industries and more intelligently tailors the delivery of compact messages or even higher-volume content to machines, which will be described in greater detail below.

The present disclosure relates to a system and method for transferring information between subscribed computing machines (herein "machines") associated with a communication service (herein "service") which is supported by a centralized or distributed set of computing resources. Machines may be fixed computers, tablet computers, mobile devices, or other electronic devices. The service tracks the Internet addresses of all machines. The service also tracks membership of all machines to groups or sub-groups of machines.

The disclosed embodiments allow machines to subscribe to a service that tracks the Internet addresses of all machines associated with the service. Specialized software on each machine maintains repetitive communications and shares its machine's Internet address with the service. The same software allows each machine to discover, via the service, which other machines are available in each of its own groups or sub-groups. The communications between this specialized software on each machine and the service are provided in a secure, encrypted manner, typical of existing services. However, a broader scope of types of communications and tailored services associated with the subscriber groups and/or sub-groups of devices are provided.

The service permits machines to share communications with other machines without implementing or having to know the Internet Protocol (IP) address of the receiving machine in advance. For each machine associated with the service, the service uses a unique naming handle which is a proxy for its IP address. Any machine may share communications content with any other machine, group, sub-group, or machines using any combination of text, generic files, video, or audio information using the unique handle. Groups and sub-groups are created, owned, and managed by specific machines, which are referred to herein a sponsor machines. Specialized software allows other machines to request membership in a group or sub-group of machines and to receive membership permissions from the sponsor machine. These permissions are retained and used by the service. Any group or sub-group may be discontinued by the sponsor machine, and the service deletes the membership associated with the group or sub-group upon notification by the sponsor machine. Sponsor machines are also permitted to modify membership permissions, the results of which are retained by the service.

The service also includes functionality permitting a group of machines to gain access to the Internet via a local area wireless technology (WI-FI) access point requiring a specific click-through sequence to verify the device's details and entitlement to WI-FI service. The click-through sequence can be stored on the service or on any machine within a defined group, and subject to query using the access point's MAC address, the service or another group member machine can share the click-through information with the requesting machine. This sharing of WI-FI resources is unique to this service's platform.

Embodiments may relate to networking services for private industry, utilities, or governmental organizations permitting machines to send and receive encrypted messages without requiring end-user knowledge of the recipient machine's IP address or any other information regarding the recipient machine.

A machine subscribes to the service and is assigned a unique handle address that is distinct from the IP address of the machine. The service recognizes the handle address of the machine and routes communications using the assigned handle address that references the IP address currently associated with the machine. This eliminates the requirement for various administrators at various transmission and reception points to know the machine's IP address. The IP address generally includes a binary number separated by periods. An IP address serves two principal functions: host or network interface identification, and location addressing. The IP address may reveal which Internet service provider (ISP) the machine is using including that, in some cases, is the machine's host company, such as company name.com. In other cases, the IP address may be just one of the large ISPs. The approximate physical location of the machine, such as the city and state, is generally recognizable, but cannot typically be determined from the actual name of the person at that IP address. Administrators of IP addresses may implement IP address managers (IPAM) or a centralized management of the IP address space to assist network engineers to identify whether an IP address is currently available in an enterprise network. Tools may be implemented to check whether a particular IP is reserved or available by scanning entire networks to obtain status of the IP Addresses. This form of IP Management requires considerable resources.

The disclosed technology eliminates the necessity of administration by providing a centralized processing system that tracks handle addresses of subscriber devices without sharing knowledge of the static or dynamic IP addresses associated with the subscriber devices. Generally, a block of IP addresses is assigned at random to computers that log on to ISPs. These randomly assigned identifications are called dynamic IP addresses. In addition, the disclosed technology provides a system to assign a group or sub-group handle address to all groups or sub-groups of machines (sub-groups generally fall within the umbrella of the category of content of a particular group), providing for a streamlined and more efficient allocation of administrative resources in handling communications among machines using the service. The domain name would serve as a proxy for an IP address.

Embodiments disclosed herein describe a system and method for provision of a service generally implemented by an ISP, to which subscribed machines request delivery of tailored content that may be private and securely delivered using encryption keys. Furthermore, the content must meet requirements before being sent to other machines. This service, while avoiding the drawbacks of existing services for delivery of compact content, such as delivery of storms of unwanted content or other noise type data, permits service providers to incorporate additional features for machines, such as automated Wi-Fi access in particular locations and/or provisioning for global communications by implementing low-volume communications among subscriber machines. The system and method also track the delivery of content to the intended group of subscribers and manages subscriptions to the service vis-à-vis sub-groups and or larger, overarching, more expansive groups. The service also provisions for exclusivity in the type of content and the delivery to the appropriate subscriber devices for the intended purposed of aiding businesses, individuals, private organizations, and/or educational institutions with specialized communications types.

Figure 1:
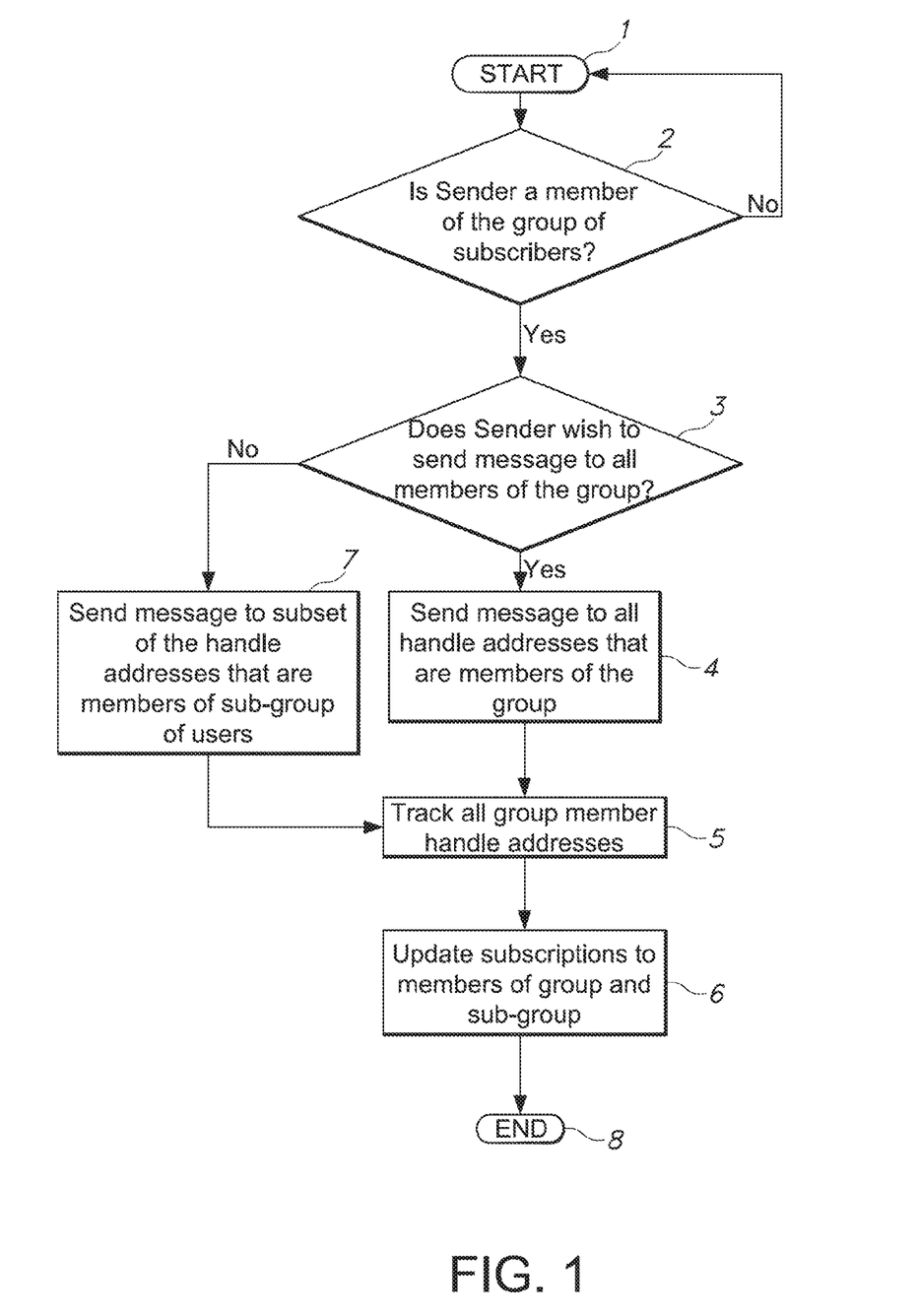
FIG. 1 is a flow chart of an exemplary method for a sender machine to process a request to transmit communications to a group or sub-group of other machines.

As shown in FIG. 1, the subscribed machine transmits information content for delivery to a group or sub-group(s) of machines via the service at operation (1). The service maintains the information until deliverable to each recipient machine, or until the age of the information exceeds a defined duration. The service determines if the sending machine is a member of the group or sub-group at operation (2). If the system determines that the sending machine is a member of the group or sub-group at operation (2), the service sends the metadata for the transmitted information to all handle addresses that are member of the group or sub-group at operation (4). Those machines within the group or sub-group use the metadata and any defined filters to notify the service to deliver the transmitted information content.

If a determination is made at operation (3) that the sender intends to send a message to a sub-set of handle addresses that are members of a sub-group of users, the system proceeds at operation (7) to send the message to only a subset of the handle addresses that are members of a sub-group of users at operation (7). The system will then proceed to track all group member handle addresses to ensure delivery to proper recipients of the sub-group at operation (5), and will then update subscriptions to members of the group and sub-group(s) at operation (6).

In certain embodiments, a machine may send communications type content and meta-data to the service, which would permit such content to be available to members of groups and sub-groups. In addition, the mere availability of such data or content to its members may be announced. The meta-data may describe the file format, data, originator and, in certain embodiments, additional encryption information. Generally, the service will not have any exposure to the transmitted content because the transmitted content is encrypted and the service would not have access to encryption keys. In a preferred embodiment, if encryption keys are required to be shared, the owner of the sponsor or sending machine would provide the key via alternate routing techniques to the owners of the requesting machines. The system is fully functional as a secure system.

Figure 2:
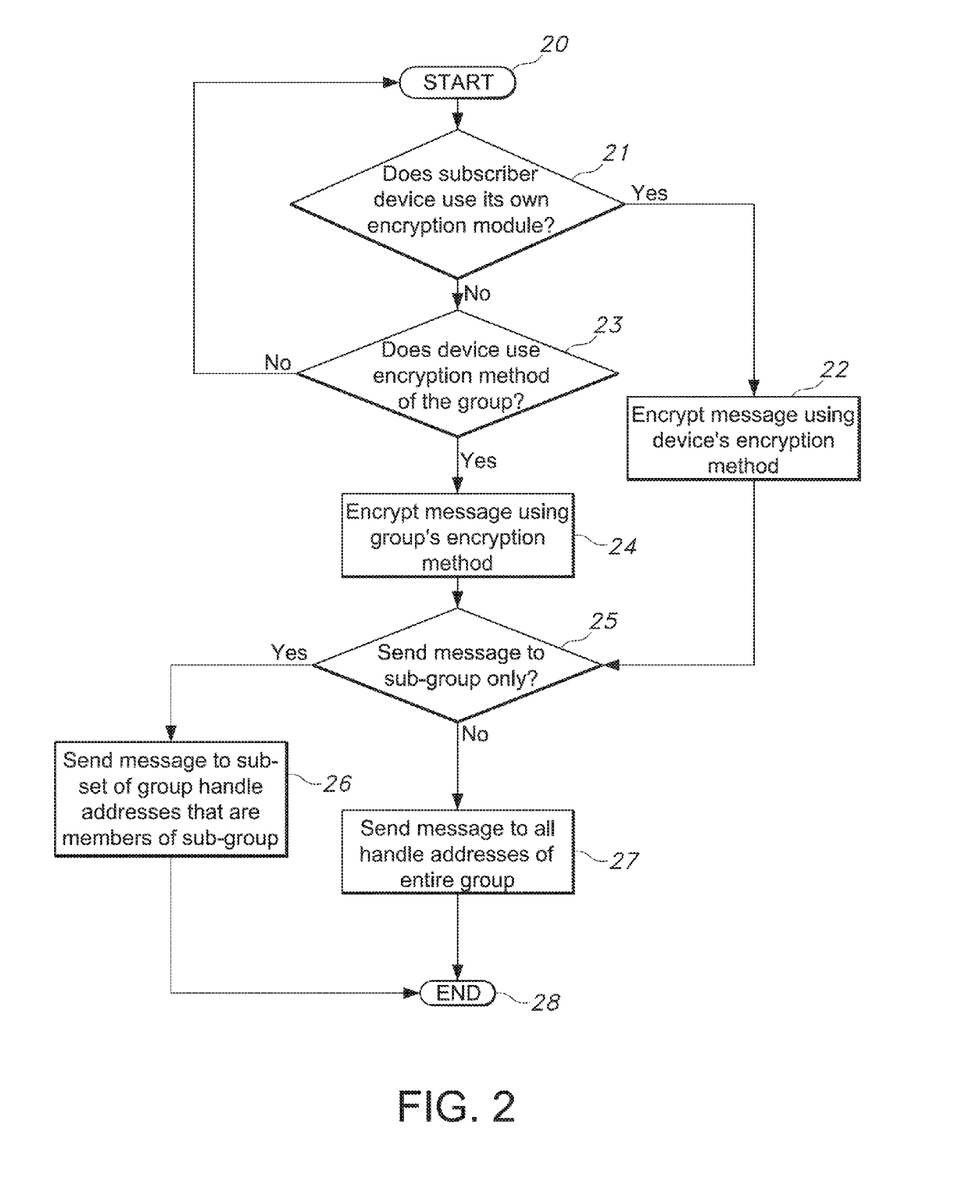
FIG. 2 is a flow chart of an exemplary encryption method for the exchange of communications between a machine and a group and/or sub-group.

In certain embodiments, as shown in FIG. 2, the subscriber device initiates the encryption method at operation (20) in response to a request to send a message to a group or sub-group of subscribers of the provisioned service. A determination is made as to whether the subscriber device implements a unique encryption module at operation (21), thereby providing the option to subscribers to use standard encryption modules or a more unique module tailored to the security needs of an organization, such as a governmental entity, which may have additional layers to their encryption requirements for transmitting communications. Once the system determines that the subscriber does implement its unique encryption module, the method proceeds to operation (22), in which the message is encrypted using the device's encryption method. In such instances, the system next determines whether the message should be sent to a sub-group of subscriber devices at operation (25), in which the system will proceed to send the message to a subset of handle addresses that are subscribers to a particular sub-group at operation (26).

If a determination is made at operation (21) that the subscriber device does not use it owns encryption module, the subscriber device will proceed to operation (23) to determine whether the device implements the encryption method of the group. If so, the system proceeds to encrypt the message using the group's encryption method at operation (24). As such, a determination is next made as to whether the user wishes to send a message to only a sub-group at operation (25). If so, the system proceeds to operation (26) vis-à-vis the user's computing device (whether handheld or other computing device) to send the message to a subset of the handle addresses that are subscribers to the sub-group. If a determination is made that the device neither uses its own encryption module at operation (21) nor implements the encryption method of the group, the device returns to the beginning of the process at operation (20). At such point, the subscriber's details must be resolved with the service provider.

If a determination is made that the user does not want to send the message to just a sub-group of devices at operation (25), then the system will proceed to operation (27), at which the message will be sent to all handle addresses that are members of the entire group (27). At such time, the system will end the encryption process at operation (28) for the sender's intended message.

Figure 3:
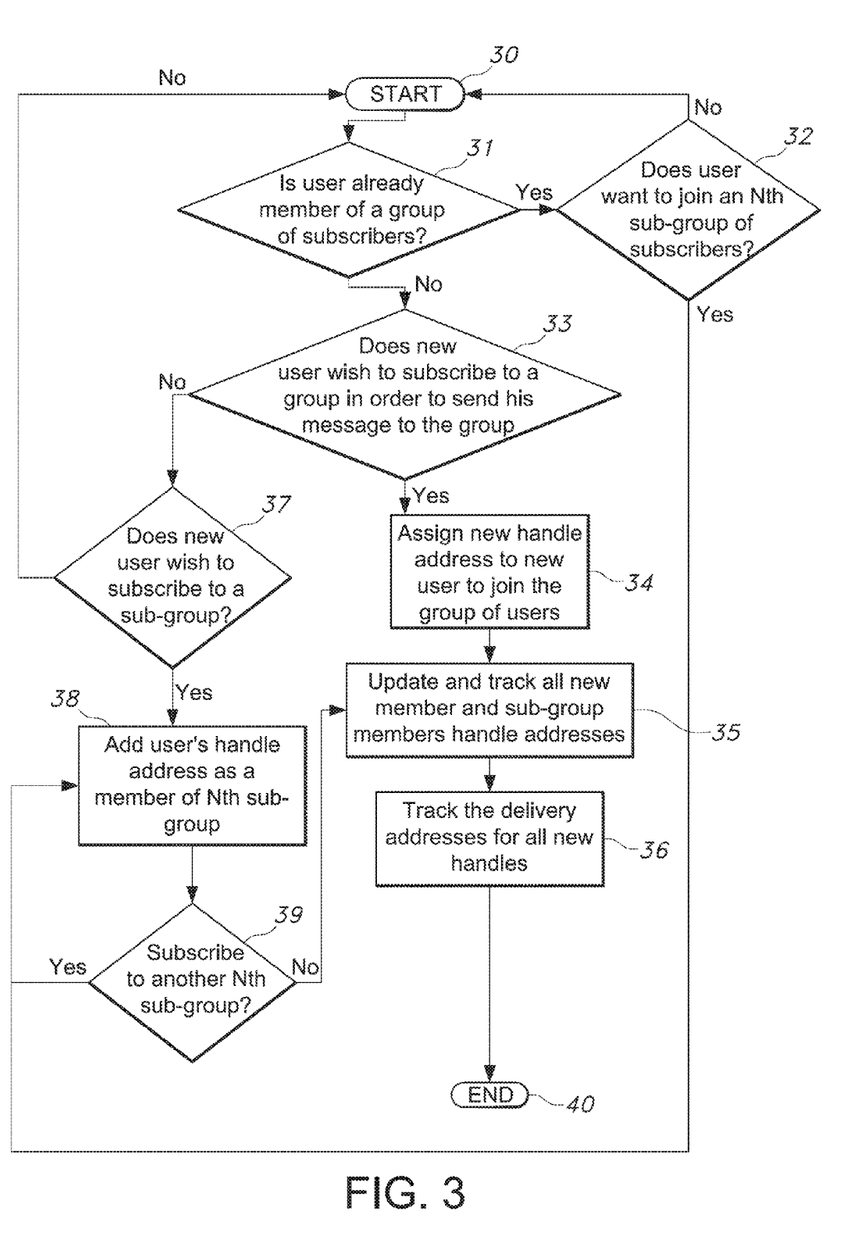
FIG. 3 is a flow chart with an exemplary method for subscription to a group and/or sub-group of the service for the exchange of communications.

FIG. 3 illustrates an exemplary method in which a device owner subscribes to the service. The process is initiated at operation (30). The system determines whether a user is a subscribed member of a group of subscribers at operation (31). If the user is a subscriber, the next operation will determine whether the user would like to proceed to join a sub-group of subscribers. A sub-group generally falls within the same umbrella or category of interest of the particular group for example, meteorological content, a particular reading group, a public interest group, etc. The users to the sub-groups further subscribe to further refined content and/or communications that is/are exchanged among users of the sub-group (but, that necessarily fall within the same category of the group). If the user does want to join an $n^{th}$ sub-group of subscribers, the system will assign a new handle address to the new member of the $n^{th}$ sub-group at operation (38). A handle address is generally similar to an assigned email address or otherwise, an address that is distinct from the IP address of the machine. At operation (39), the system will next determine whether the machine would like to subscribe to an additional $n^{th}$ sub-group. If so, the user is assigned a new handle address in order to subscribe to an $n^{th}$ sub-group at operation (38). Alternatively, the sub-group will now recognize the user's handle address originally assigned upon subscription to the service and will add the user's handle address as a new member of the $n^{th}$ sub-group. Once the user has established all subscriptions to each of the n sub-groups, the system will update and track all new member and sub-group members handle addresses at operation (35). The system will also be initialized to recognize and track the delivery addresses for all newly added address handles at operation (36). In certain embodiments, the machine may also request that these newly assigned handle address and/or their respective group names be configured as either public or private. This may be accomplished when the handle address is assigned in operation (34) in certain embodiments. In such case in which group names are configured as private, the subscribed group machines or sub-group machines are unable to either recognize and/or have access to any listing of information regarding any subscribed members whether sub-group members or group members.

Figure 4:
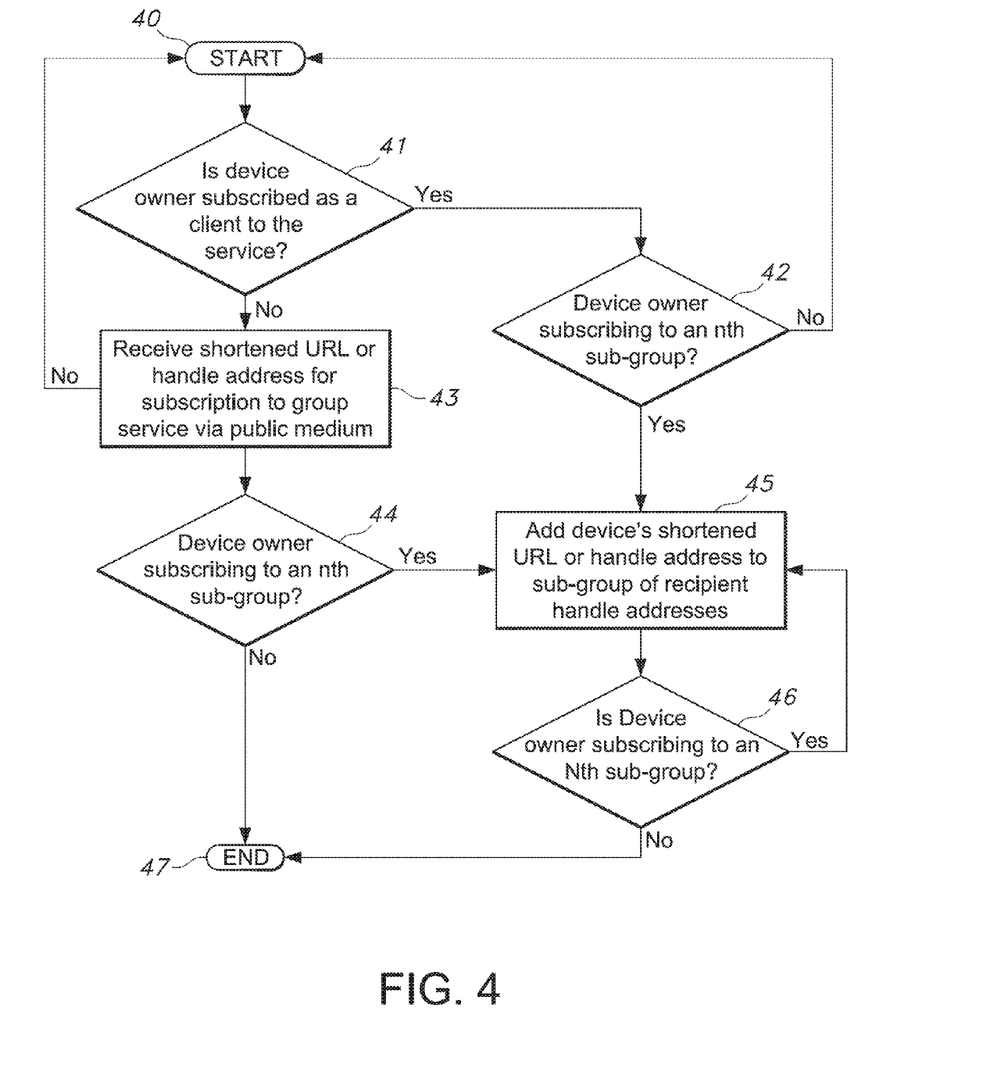
FIG. 4 is a flowchart that demonstrates an exemplary method of machine subscribing to groups and/or sub-groups of the service.

FIG. 4 illustrates another exemplary method in which a user of a machine subscribes to the service as a group and/or sub-group member(s). The process starts at operation (40) to which the system next determines whether the device or machine user is subscribed as a client to the service at operation (41). If so, the system next will determine if the device or machine owner is subscribing to an $n^{th}$ sub-group at operation (42). If not, the process will proceed to operation (43) in which the user receives a shortened URL or handle address for subscription to group service via a public medium. The public medium may include any form of signal transmission such as ISP, cellular, satellite link, etc. The system will next determine whether the owner wishes to subscribe to an $n^{th}$ sub-group of subscribers at operation (44). If not, the process will end at operation (47). If the user does wish to proceed to subscribe to an nth sub-group, it will add the machine or device's shortened URL or handle address to the sub-group of recipient handle addresses at operation (45). The system will next determine if the user wishes to subscribe to an additional Nth sub-group and, if so, the system will proceed again to operation (45). Otherwise, the process will terminate at operation (47).

Figure 5:
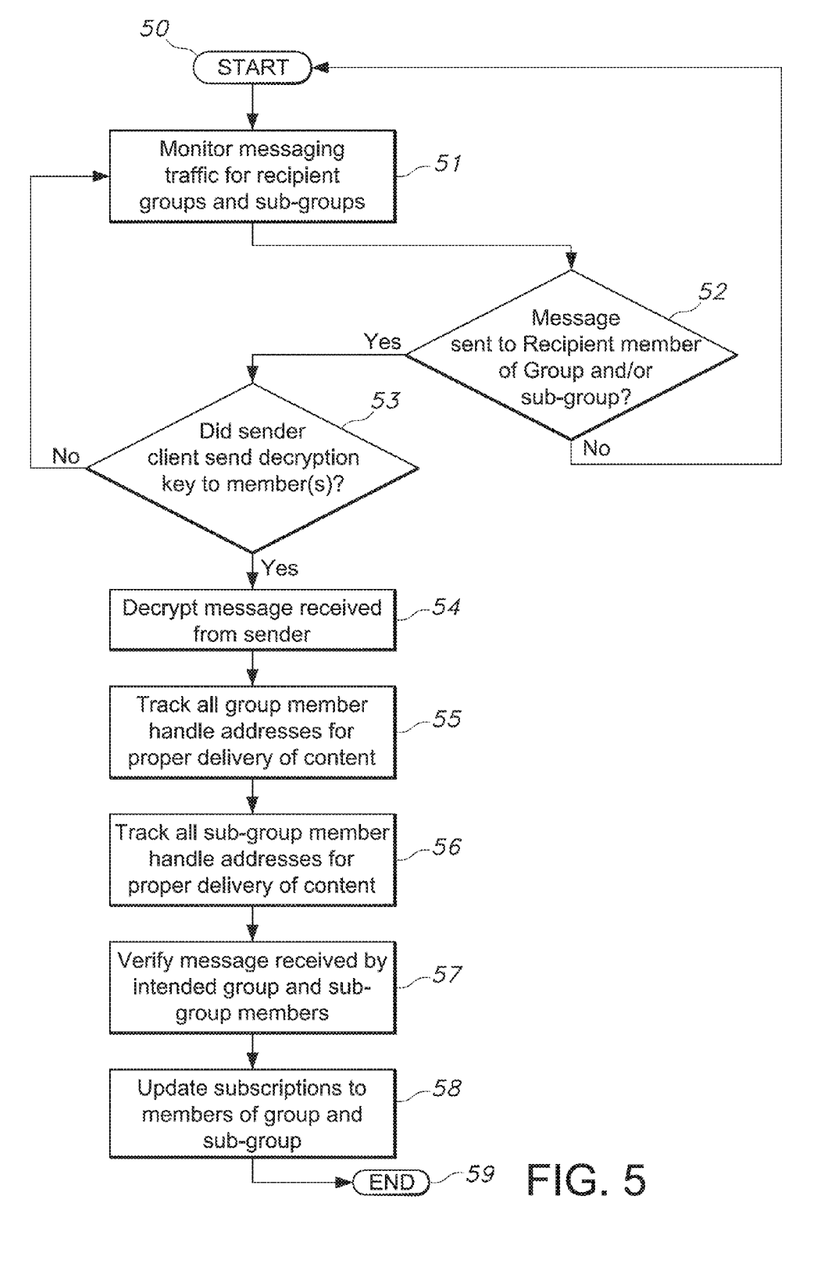
FIG. 5 is a flowchart that shows an exemplary method of tracking and verifying transmission of communications to recipients.

FIG. 5 illustrates an embodiment of a tracking and verification module as performed by the tracking and verification server in accordance with the disclosed embodiments. The process will commence at operation (50) at which the system proceeds to monitor any messaging traffic or communication transmitted to recipient groups and sub-groups at operation (51). The system will next check whether a message has been delivered to a recipient member of a group and/or sub-group at operation (52). If not, the system will proceed to operation (50) at which the process commences. Otherwise, the system will next determine whether the sender client sent a decryption key to the members of the group and/or sub-group at operation (53). If not, the system will return to operation (51) to monitor any messaging traffic for recipient groups and sub-groups. Otherwise, the system next decrypts the message received by recipient member at operation (54). The system will next track all group member handle addresses to ensure proper delivery of content to all group member handles at operation (55). Subsequently, the system proceeds to operation (56) to track all sub-group member handle addresses for proper delivery of content to any sub-group members. The system next verifies whether any message(s) has been received by the intended group and sub-group members at operation (57). The system next updates subscription to members of groups and sub-groups for any newly received group or sub-group members at operation (58).

Figure 6:
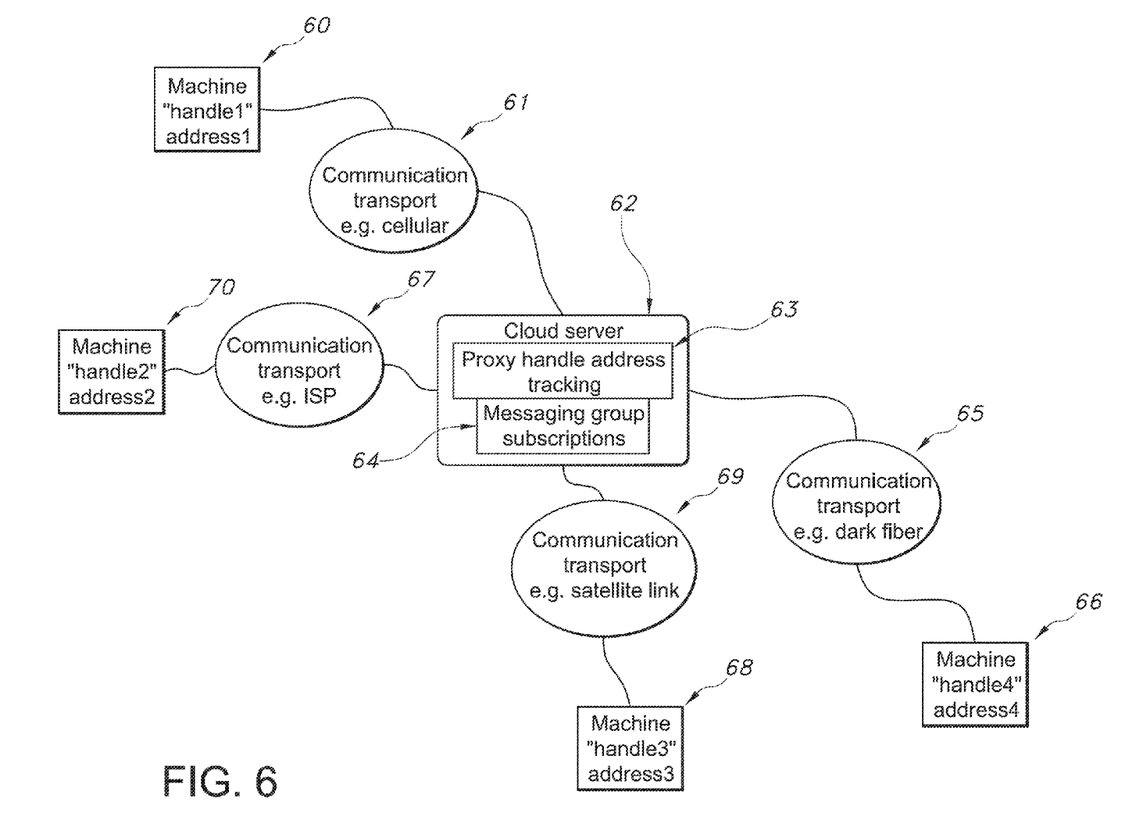
FIG. 6 is a block diagram illustrating an embodiment of the system configuration for provisioning service to transmit communications among machines in a group or sub-group.

FIG. 6 illustrates a block diagram of an embodiment of the system configuration for the provisioned service. As indicated in the shown embodiment of the system, the communication interface between a machine (60) having a handle address 1 and the central server (62) may be a communication transport medium, such as a cellular network link (61). The communication transport medium between machine handle address 2 (70) and the central server (62) may be a communication transport, such as ISP (67). The communication transport medium between a machine with a handle address 3 (68) may be a communication transport, such as a satellite link (69). Finally, another communication transport medium may include a dark fiber (65), as indicated between machine handle address 4 (66) and central server (62). The central server (62), which may include a cloud server (71), tracks each of the handles for group and sub-group member s to the service. Additionally, the central server (62) keeps track of the delivery/connection addresses for each of the handles delivering and/or receiving content using the provisioned service. A proxy handle address module (63) tracks each of the handles. In addition, a messaging module (64) tracks the subscriptions. Each of the handles can send messages to all handles and each machine subscribes to the feed. Each handle can also create a private messaging group. The message may be encrypted and those handles that are granted a decryption key are able to receive the transmitted message. If a message feed is exposed rather than otherwise private or unexposed, then the handles not currently included on the subscription list can request subscription, which is subject to approval by a system administrator.

Moreover, each machine can determine its own encryption method and keys. Encryption keys are delivered to the subscribing machine either via the cloud server or via an independent route, such as e-mail or a different messaging service, which improves security. The subscribing machine can then identify to which machine(s) a decryption key is deliverable.

Figure 7:
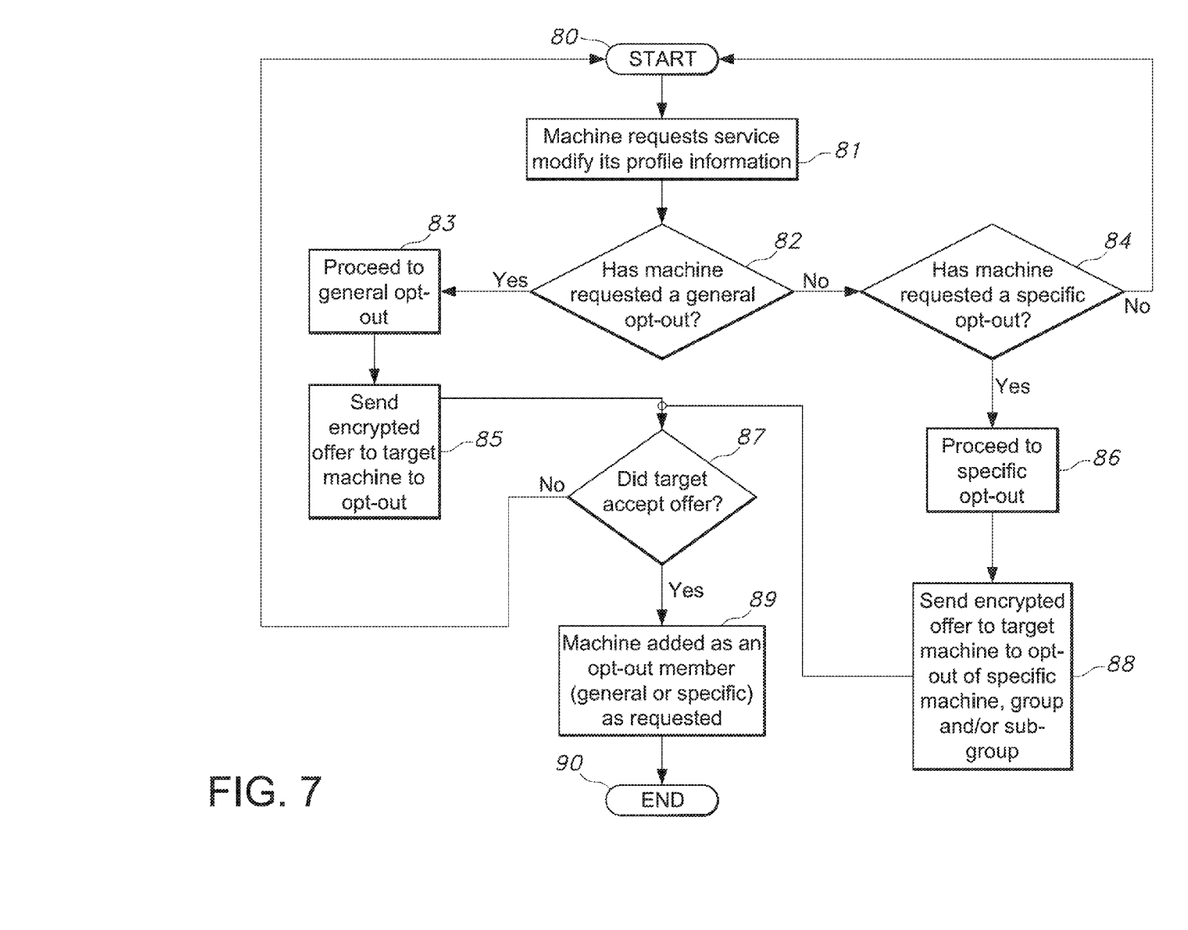
FIG. 7 is a flowchart that provides an exemplary method for a machine to modify its profile information in a provisioned service.

FIG. 7 is a flowchart that shows an exemplary method for a subscribed machine to modify its profile information in the provisioned service. A subscribed machine can modify the handles or memberships of its groups and sub-groups. In certain embodiments, a machine is able to add an additional machine to its group and/or delete the machine from its group. The added machine is able to opt-out and receive no communications related to the group if desired during a configuration operation. A machine is able to add its handle address or identification associated with the provisioned service into a general exclusionary category for blocking messaging similar to a do-not-call or do-not-message list. Furthermore, a machine is able to add its handle address or identification associated with the provisioned service into a specific exclusionary category to block any messaging or communications with a specific group or sub-group.

As shown in FIG. 7 at operation (80), the process begins with a machine initiating a request to the service in order to authorize certain modifications to its configuration profile details at operation (81). As part of the configuration profile, the user can indicate a general opt-out or specific opt-out. The process will detect which request has been entered at operation (82) and either continue to the general opt-out (83) route or otherwise determine whether a specific opt-out has been requested by the machine at operation (84). If the system detects that neither a general or specific opt-out request has been entered, the process will return to initial operation (80) at which the system awaits a request to modify its profile information at operation (81). Otherwise, the system will proceed to a general opt-out route at operation (83) or to the specific opt-out route at operation (86) depending on which request is detected at operation (82) and/or operation (84). The system will next proceed to send an encrypted offer to a target machine to opt-out either generally at operation (85) or opt-out of a specific group or sub-group at operation (86). At this point, the system will proceed to check whether the target machine accepted the offer at operation (87). If the offer is not accepted, the system will return to the initial operation (80), at which point, it awaits that the request to modify its profile information. Otherwise, the machine will be added as an opt-out member at operation (89). The particular type of opt-out member depends on whether a general or specific opt-out is selected in accordance with the machine's initial request at operation (81). The encrypted offer sent to the target machine at either operation (85) or operation (88) prevents spoofing of an acceptance of the offer. A general opt-out option, as achieved by operations (83) through operation (90), would prevent all other machines from automatically adding that requesting or target machine to one of their groups or sub-groups. A general opt-out can only be instituted if the requesting machine accepts the encrypted offer to opt-out. If a machine specifically opts out of membership(s) from specific other machines, then the other machines would be able to add any other machines to their own groups or sub-groups, but not the specified machines that requested a specific opt-out. In certain embodiments, a specific opt-out from communications with certain machines may further include the preclusion of even an automated offer of membership to target machines, which have already opted-out.

In other embodiments, a machine may select to receive content of any files maintained by the service, for which it is subscribed to and has the requisite membership criterion, if applicable. For example, a machine may be subscribed to a specific sub-group. The service may maintain additional content, either because the machine just recently subscribed and there exists a large scope of prior content, or because the machine may have opted-out and then requested re-entry into the group, sub-group, and the like. In this case, the machine does not access content that is part of the group's or sub-group's library of content maintained by the service. Therefore, the service may be provisioned to provide access for a machine to a complete library of content in certain cases in which the machine was otherwise restricted from accessing the complete library of content.

Figure 8:
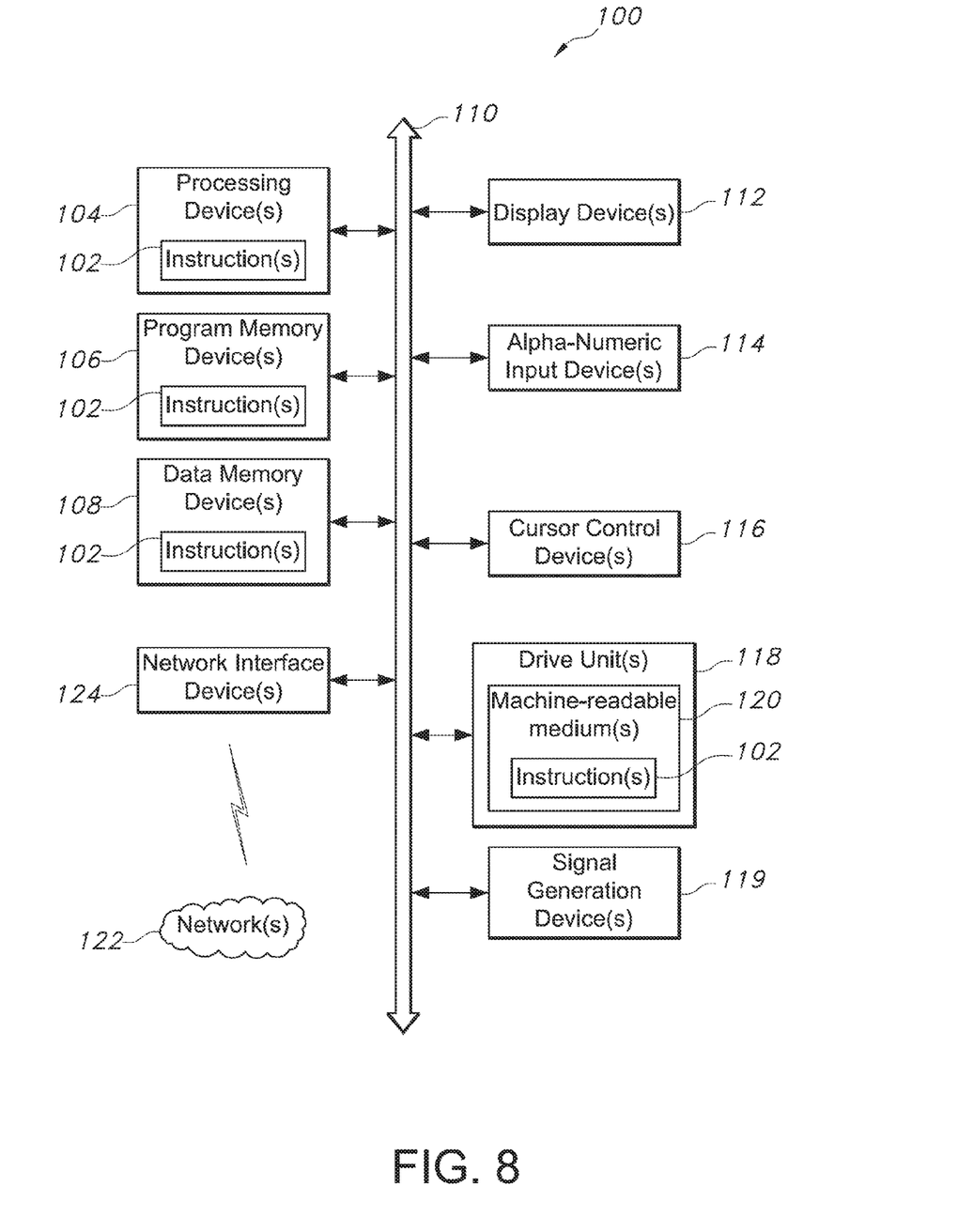
FIG. 8 is a block diagram showing a portion of an exemplary machine in the form of a computing system that performs methods according to one or more embodiments.

FIG. 8 is a block diagram of an embodiment of a machine in the form of a computing system 100, within which a set of instructions 102 is stored, that when executed, causes the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (such as a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of transferring information between subscribers associated with a communication service, the method comprising:
   receiving, by a computing device, a first handle address associated with a first subscriber device, the first handle address being a first proxy address distinct from an assigned first IP address, the first subscriber device transferring information to a group of subscriber devices, each of the group of subscriber devices being linked to different handle addresses, each of the different handle addresses being included in a group of handle addresses, the different handle addresses being proxy addresses distinct from IP addresses assigned to the group of subscriber devices;
   determining, by the computing device, whether the first handle address is included in the group of handle addresses;
   determining, by the computing device, an encryption of the first subscriber device based on whether the subscriber device is associated with an individual encryption or with encryption of the group of subscriber devices;
   transferring, by the computing device, information from the first subscriber device to the group of subscriber devices in response to the first handle address being included in the group of handle addresses based at least on the encryption of the first subscriber device;
   verifying, by the computing device, that the transferred information was received by the group of subscriber devices;
   requesting, by the first subscriber device, a general exclusion of membership in the group of subscriber devices; and
   granting, by the computing device, an exclusion of membership in response to acceptance of an encrypted exclusion offer.

2. The method of claim 1, further comprising providing an encryption key to the first subscriber device, the encryption key enabling the first subscriber device to identify the group of handle addresses to which a decryption key was delivered.

3. The method of claim 2, further comprising providing the decryption key to the group of handle addresses.

4. The method of claim 1, wherein the group of subscriber devices further comprises a sub-group of subscriber devices, the sub-group of subscriber devices enabling selective messaging between subscribers devices associated with the sub-group of subscriber devices.

5. The method of claim 4, further comprising requesting, by the first subscriber device, a general exclusion of membership in the sub-group of subscriber devices.

6. The method of claim 1, further comprising requesting, by the first subscriber device, a specific exclusion of membership with a specific subscriber device.

7. The method of claim 5, further comprising granting an exclusion of membership in response to acceptance of an encrypted exclusion offer.

8. The method of claim 6, further comprising granting an exclusion in response to acceptance of an encrypted exclusion offer.

9. A system that transfers information between subscribers associated with a communication service, the system comprising:
   a computing device comprising: a processor and a memory;
   a server computer that interfaces with the computing device, the computing device configured to:
   receive a first handle address associated with a first subscriber device, the first handle address being a first proxy address distinct from an assigned first IP address, the first subscriber device transferring information to a group of subscriber devices, each of the group of subscriber devices being linked to different handle addresses, each of the different handle addresses being included in a group of handle addresses, the different handle addresses being proxy addresses distinct from IP addresses assigned to the group of subscriber devices;
   determine whether the first handle address is included in the group of handle addresses;
   determine an encryption of the first subscriber device based on whether the subscriber device is associated with an individual encryption or with encryption of the group of subscriber devices;
   transmit information from the first subscriber device to the group of subscriber devices in response to the first handle address being included in the group of handle addresses based at least on the encryption of the first subscriber device as determined by the processor;
   verify whether the transferred information was received by the group of subscriber devices;
   request a general exclusion of membership in the group of subscriber devices; and
   grant an exclusion of membership in response to acceptance of an encrypted exclusion offer.

10. The system of claim 9, wherein the computing device is further configured to provide an encryption key to the first subscriber device, the encryption key enabling the first subscriber device to identify the group of handle addresses to which a decryption key was delivered.

11. The system of claim 10, wherein the computing device is further configured to provide the decryption key to the group of handle addresses.

12. The system of claim 9, wherein the group of subscriber devices further comprises a sub-group of subscriber devices, the sub-group of subscriber devices enabling selective messaging between subscribers devices associated with the sub-group of subscriber devices.

13. The system of claim 12, wherein the first subscriber device requests a general exclusion of membership in the sub-group of subscriber devices.

14. The system of claim 9, wherein the first subscriber device requests a specific exclusion of membership with a specific subscriber device.

15. The system of claim 14, wherein the operations further comprise generating computing device is further configured to generate an exclusion in response to acceptance of an encrypted exclusion offer.

16. A computer-readable device storing instructions that, when executed by a processing device, cause the processing device to perform operations comprising:

receiving a first handle address associated with a first subscriber device, the first handle address being a first proxy address distinct from an assigned first IP address, the first subscriber device transferring information to a group of subscriber devices, each of the group of subscriber devices being linked to different handle addresses of the group of handle addresses, each of the different handle addresses being included in the group of handle addresses, the different handle addresses being proxy addresses distinct from IP addresses assigned to the group of subscriber devices;

determining whether the first handle address is included in the group of handle addresses;

determining an encryption of the first subscriber device based on whether the subscriber device is associated with an individual encryption or with encryption of the group of subscriber devices;

transferring information from the first subscriber device to the group of subscriber devices in response to the first handle address being included in the group of handle addresses based at least on the encryption of the first subscriber device; and verifying that the transferred information was received by the group of subscriber devices;

requesting a general exclusion of membership in the group of subscriber devices; and granting an exclusion of membership in response to acceptance of an encrypted exclusion offer.

\* \* \* \* \*